United States Patent [19]

Schilling et al.

[11] 4,425,303

[45] Jan. 10, 1984

[54] FLUIDIZED BED REACTOR FOR PARTICULATE MATERIAL

[75] Inventors: Hans-Dieter Schilling, Hattingen; Ulrich Grabenhorst, Gangelt, both of Fed. Rep. of Germany

[73] Assignee: Bergwerksverband GmbH, Essen, Fed. Rep. of Germany

[21] Appl. No.: 488,773

[22] Filed: Apr. 26, 1983

Related U.S. Application Data

[63] Continuation-in-part of Ser. No. 275,515, Jun. 15, 1981, abandoned.

[30] Foreign Application Priority Data

Jun. 14, 1980 [DE] Fed. Rep. of Germany ....... 3022441
Jan. 22, 1981 [DE] Fed. Rep. of Germany ....... 3101942

[51] Int. Cl.³ ............................ B01J 8/30; B01J 8/44; F26B 3/08; F27B 15/08
[52] U.S. Cl. ......................................... 422/142; 34/10; 34/57 A; 422/116; 422/141; 422/143; 422/145; 422/146; 431/7; 431/170; 432/15; 432/58
[58] Field of Search ............... 422/143, 145, 142, 146, 422/116; 431/7, 170; 432/15, 58; 34/57 A, 10

[56] References Cited

U.S. PATENT DOCUMENTS

| 2,838,382 | 6/1958 | Riggenberg | 422/145 X |
| 2,990,260 | 6/1961 | Mungen | 422/143 |
| 3,283,413 | 11/1966 | Mayer et al. | 422/143 X |
| 3,881,857 | 5/1975 | Hoy et al. | 431/7 |
| 3,977,947 | 8/1976 | Pyle | 432/15 X |
| 4,165,568 | 8/1979 | Gibert et al. | 432/58 X |
| 4,244,305 | 1/1981 | Kawano et al. | 431/170 X |

FOREIGN PATENT DOCUMENTS

| 758006 | 4/1971 | Belgium | 422/143 |
| 590007 | 1/1978 | U.S.S.R. | 422/143 |
| 700192 | 11/1979 | U.S.S.R. | 422/145 |

Primary Examiner—Barry S. Richman
Attorney, Agent, or Firm—Michael J. Striker

[57] ABSTRACT

A method of treating a particulate material in a fluidized bed reactor includes supplying a particulate material into a working space above at least one zone which is characterized by reduced passage of a fluidizing gas. A fluidizing bed reactor is designed so that its means for supplying a particulate material is arranged above at least one zone of the reduced passage of the fluidizing gas. The passage of the fluidizing gas in this zone can be completely prevented. Jalousie-shaped inserts are arranged above edges of the zone and have inclined surfaces.

23 Claims, 11 Drawing Figures

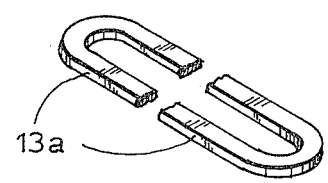
F I G. 3a
F I G. 3b
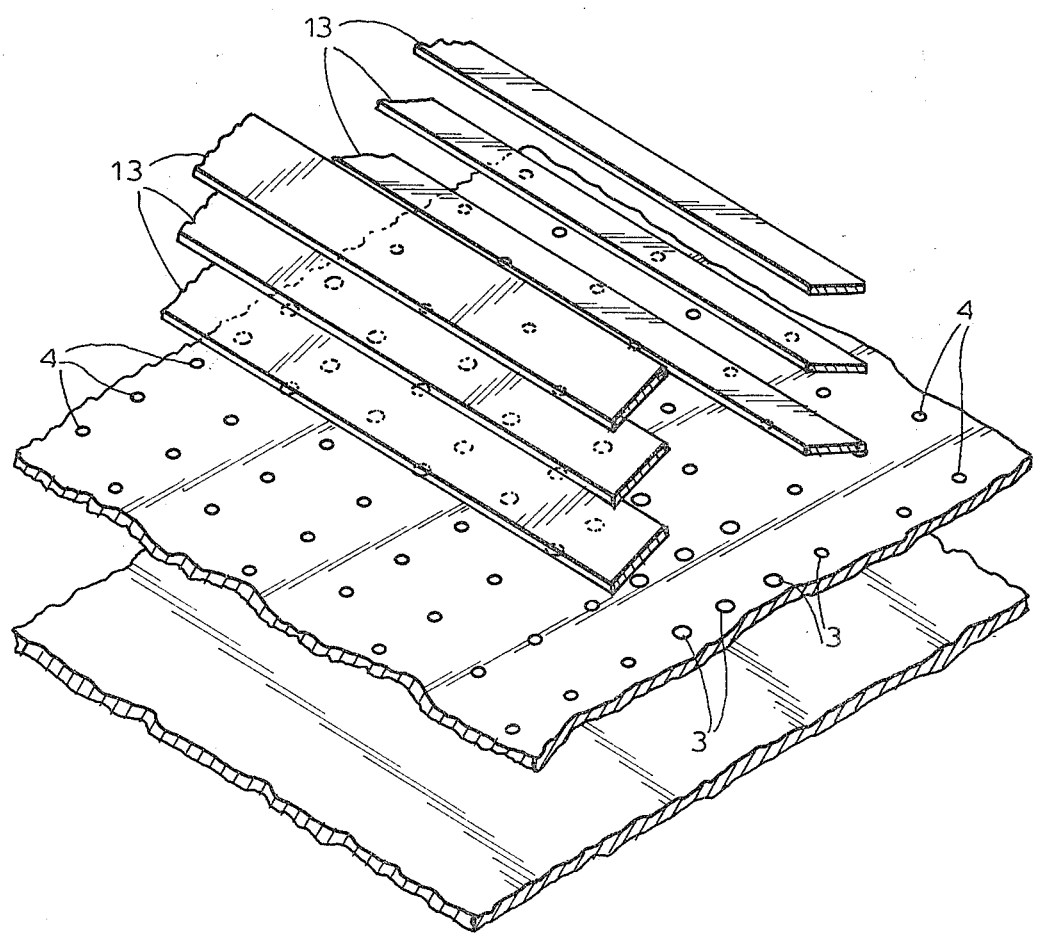

FLUIDIZED BED REACTOR FOR PARTICULATE MATERIAL

CROSS-REFERENCE TO RELATED APPLICATION

This application is a continuation-in-part of application Ser. No. 275,515 filed June 15, 1981 now abandoned.

BACKGROUND OF THE INVENTION

The present invention relates to a method of treating particulate materials in a fluidized bed reactor, and to a fluidized bed reactor for treating the same.

During operation of a fluidized bed reactor, for example, for heating fine grain coil in a fluidized bed, there is always a danger that a part of the supplied particulate material (either the fluidized bed material and/or the solid material to be treated such as for example the fuel) will be pneumatically carried out from the fluidized bed with the fluidizing gas prior to its intended or desirably complete reaction, for example prior to the complete burning of the grains of the particulate material grains. This takes place particularly for particulate material with very small diameter, and first of all when this material moves in the fluidized bed together with greater particles, since the dragging force of the fluidized bed stream is greater than the own weight of such particulate material.

Since for example in the event of heating of coal in fluidized bed the portion with smaller coal grains in the fuel supply is not small, the above mentioned phenomenon can lead to an undesirably low burning degree. The coal dust contents remaining in the flying dust is so high that an additional burning in a specially designed fluidized bed chamber is required. Naturally, such problems also take place during treatment of other particulate materials and conducting other reactions in the fluidized bed.

Moreover, there is also a problem in the uniformity of the particulate material supply when the fluidized bed reactors are very big and concentration gradient in the fluidized bed must be as small as possible over the entire fluidized bed for conducting proper chemical reactions.

It is known to supply particulate materials into fluidized bed reactors by throwing the same from above into the fluidized bed, for example with the aid of sprinklers arranged on the walls of the reaction chamber, as used, for example, for supply of nontreated coal. This method, however, has the disadvantage in the fact that it results in a limited radius of action and more or less visible separation effect in the event of strongly controlled grain composition of the particulate material by formation of different trajectory throwing parabolas and by air sifting.

It is also known to provide falling shafts in the region of the top of the fluidized bed reactors. In this case the delivery of the particulate material is only of a point type and possible in such regions which are located below a solid top. Since very often the flue gas withdrawal requires considerable space in the region of the top, a uniform delivery in the construction with the falling shafts is possible only in the event of lateral arrangement of flue gas withdrawal means.

Finally, it is known to supply the particulate material with the aid of screws and air nozzles into the lower part of the fluidized bed. In this case, a stream pipe extends with its mouth tightly through the bottom of the fluidized bed. This construction has a disadvantage in the fact that a supply of the particulate material must be carried out at the pressure level of the fluidized bed reaction and also many nozzles are required for uniform feeding. Moreover, the particulate material must be relatively finely ground which, in the event of fuel can cause the danger of self-ignition in the supply conduits. Finally, at the supply locations, gas bubbles or streams can be formed which travel up to the fluidized bed upper surface. As a result of this, the reaction time for particles entrained by the gas bubbles and streams is undesirably short.

SUMMARY OF THE INVENTION

Accordingly, it is an object of the present invention to provide a fluidized bed reactor and a method of treating a particulate material therein, which avoid the disadvantages of the prior art.

More particularly, it is an object of the present invention to provide a method of treating a particulate material in a fluidized bed reactor, and a fluidized bed reactor therefor, which provide for very uniform reaction time for particles of the particulate material supplied into the fluidized bed, so that fine particles do not prematurely travel to the upper surface of the fluidized bed prior to the required complete reaction, and concentration gradient in the fluidized bed is considerably reduced.

In keeping with these objects and others which will become apparent hereinafter, one feature of the present invention resides, briefly stated, in a method of treating particulate materials in a fluidized bed reactor, in accordance with which the particulate material is supplied into a working chamber of the reactor above at least one zone of a reduced passage of the fluidizing gas through the bottom, and the method includes the steps of arranging in the working space a plurality of inserts, forming the inserts so that they are jalousie-shaped, arranging the inserts above the edges of said zones of said bottom, and providing the inserts with surfaces which are inclined towards said one zone of said bottom.

It is another feature of the present invention to provide a fluidized bed reactor in which means for supplying a particulate material is arranged above at least one of the above mentioned zones with reduced passage of the fluidizing gas, a plurality of inserts are arranged in the working space, the inserts are formed so that they are jalousie-shaped, arranged above said edges of said zones of said bottom, and having surfaces which are inclined towards said one zone of said bottom. The supply of the particulate material can also be performed above the zones in which the passage of the fluidizing gas is prevented completely.

The type of the particulate material and the treatment which takes place in the fluidized bed reactor have no influence upon the practicability of the invention. The utilization of the invention for fuels, particularly coal, provides for an especially highly advantageous result inasmuch as the grain differential of the individual particles is known to be very great.

As long as the supplied particulate material is located inside the fluidized bed, a separation between fine grain and coarse grain fuel by the fluidizing gas is not to be of concern, as in the event of an air sifting. First when particles of the particulate material, which because of their low weight satisfy the requirement for pneumatic feeding, appear on the upper surface of the fluidized bed, they are carried out with the drawing gas. It has been found that a downwardly directed stream of solid particles stream takes place in the fluidized bed in the zones of the bottom in which the passage of the upwardly flowing fluidizing gas is reduced or completely prevented. Particles of the particulate material which are delivered in this region of the fluidized bed travel thereby first deeply in downward direction toward the bottom. Thereby, the dwell time (immersion time) of the fuel and thereby the reaction time particularly for small particles are considerably increased, which results for example for the coal burning in a high burning device.

The jalousie-shaped inserts arranged above the edges of the quieting zones of the bottom prevent travelling of the fluidized gas bubbles into the region of the particulate material feeding and also into the region above the quieting zones. In this case the desired movement of the particulate material particles is only insignificantly disturbed. It is especially advantageous when in accordance with the present invention the inserts have surfaces which are inclined to the quieting zones. In such a construction the entrance of the fluidized gas from outside of the quieting zones into the latter is considerably reduced or prevented.

The inserts have an advantage in the fact that the entrainment of gas bubbles into the quieting zones is prevented. Thereby the time of movement of the particles of particulate material in the fluidized bed is longer. This leads, for example for coal burning in the fluidized bed, to improvement in combustion and reduction of coal particles contents in the removed ashes. Thereby the effectiveness of treatment in the fluidized bed is considerably improved.

The blades of the jalousie-shaped inserts is also inclined so that when the particulate material is fed from above into the quieting zone it cannot penetrate through the inserts and flow outwardly of the quieting zone. The inclined blades guide the particulate material downwardly and provide the downward movement of the particulate material to the very bottom.

The above mentioned downwardly directed streams are formed by designing the bottom so that the air passage is reduced or completely prevented in the respective zones of the bottom. In order to prevent depositing and coking of the material of the fluidized bed, conical, pyramidal or prismatic inserts are arranged directly on the above mentioned quieting zones of the bottom. In accordance with the invention, the angle of the outer surface of the inserts is greater than the friction angle of the fluidized bed material (particles of the particulate material). The material supply device is arranged vertically above the quieting zones inside or outside of the fluidized bed, advantageously at the height of its upper surface. It is especially effective when the quieting zones are distributed over the bottom in form of successively arranged bands.

The uniformity of the particulate material supply is attained in accordance with the present invention by providing a plurality of throughgoing openings in the supply devices, the openings being arranged at uniform distances from one another. It is also possible to cool the supply devices, for example by water cooling. This contributes to the prevention of premature reaction and coking in the event of the utilization of conveyor screws as supplying devices. Precautionary measures can also be taken against corrosion and erosion of the supply devices.

In accordance with the invention, the supply device can be formed as a displaceable strap which allows to supply a moist particulate material uniformly into the fluidized bed without a further treatment. The displaceable strap is so designed in accordance with the present invention so that it is filled outside of the fluidized bed reactor and emptied inside the latter. Thereby, the dwell time of the displaceable strap inside the reactor is very short.

When the fluidized bed is subjected to pressure and also in other cases when escape of the fluidized gas through the supply device is undesirable, a sealing element is provided in accordance with the invention between the displaceable strap and the fluidized bed reactor.

A synchronizing device is provided for automatic filling, displacing and emptying of the displaceable strap and provides for friction-free automatic performance of individual operational steps, which allows, for example a programmed loading of the fluidized bed reactor by variation of the cycle time.

A further advantageous feature of the present invention resides in the fact that modular structural groups can be formed each composed, for example, of the displaceable strap and its actuating device. Thereby it is possible to provide prefabricated units and to install them at the respective locations in a fluidized bed reactor.

The displaceable strap can be formed as a one piece member having an outwardly open groove, so that it can be turned about its longitudinal axis for its emptying. In accordance with an alternative solution, the displaceable strap may be composed of two members or shells. In this case, the particulate material can be introduced into the fluidized bed reactor enclosed in the strap and then discharged by relative rotation or displacement of the members or shells. Thereby a premature reaction or discharge of loosely located smaller particles during the insertion step can be prevented.

When a displaceable strap having a length corresponding to the double width of the fluidized bed reactor is utilized, an alternative operation with two filling devices is possible, wherein the filling devices are arranged at both sides of the fluidized bed reactor. Thereby the loading cycle is actually doubled.

It is especially advantageous when in accordance with the present invention the inserts are such that a cooling medium flows through the same and thereby they have longer service life as compared with the not-cooled inserts and can be produced less temperature-resistant materials. Moreover, these inserts may form components of heat exchange elements provided in the fluidized bed reactor. Especially in the event of burning in the fluidized beds, water can be heated and/or vapor can be produced, and the inserts can be integrated into the system of the immersed heating elements or pipe register.

Finally, in accordance with the present invention, several bottoms with associated supply devices can be arranged in the same fluidized bed reactor so as to provide for an especially advantageous utilization of the fluidizing gas and a compact construction of the reactor. Particularly, several fluidized beds can be arranged one above the other without causing the conventional problems with particulate material supply.

Because of the uniform distribution during the particulate material supply and the wind directional effect, the fluidized bed reactors can be so big as is allowed by the strength of the supply devices arranged therein, and thereby considerably bigger than the conventional fluidized bed reactors with limited output.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3a is a view showing the insert in accordance with a different embodiment, on an enlarged scale;

FIG. 3b is a perspective view of the fluidized bed reactor of FIG. 3;

DESCRIPTION OF THE PREFERRED EMBODIMENTS

Figure 1:
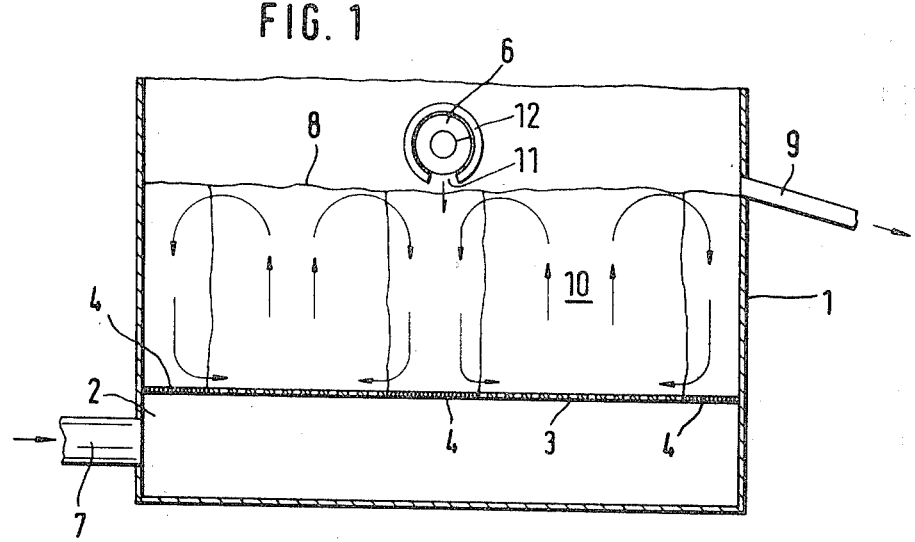
FIG. 1 is a view showing a section of a fluidized bed reactor in accordance with the present invention.

The fluidized bed reactor is identified by reference numeral 1 in FIG. 1 and shown schematically without a heating pipe. It has an air box 2 in its bottom region and a bottom 3 above the air box, for passage of a fluidizing gas. The bottom has several zones which are identified by reference numeral 4 and characterized by a reduced gas permeability. These zones are quieting zones.

The fluidizing gas is supplied through the conduit 7 into the air box 2 and passes through the bottom 3. A partial stream which is directed predominantly downwardly is generated above the zone 4 in a fluidized bed 10, as indicated by directional arrows. A particulate material is supplied above a central zone 4 with the aid of a supply device 6 formed here as a conveyor screw. This particulate material is drawn downwardly under an upper surface 8 of the fluidized bed 10 approximately to the bottom 3 under the action of a downwardly directed dragging force which dominates at this location of the fluidized bed. In the region of the bottom, the particulate material changes its direction to the not-quieting zones of the bottom 3 and travels then upwardly under the action of the stream action of the upwardly directed fluidizing gas. The particles of particulate material which have been subjected to the reaction leave the fluidized bed reactor 1 via an overflow outlet 9.

Figure 2:
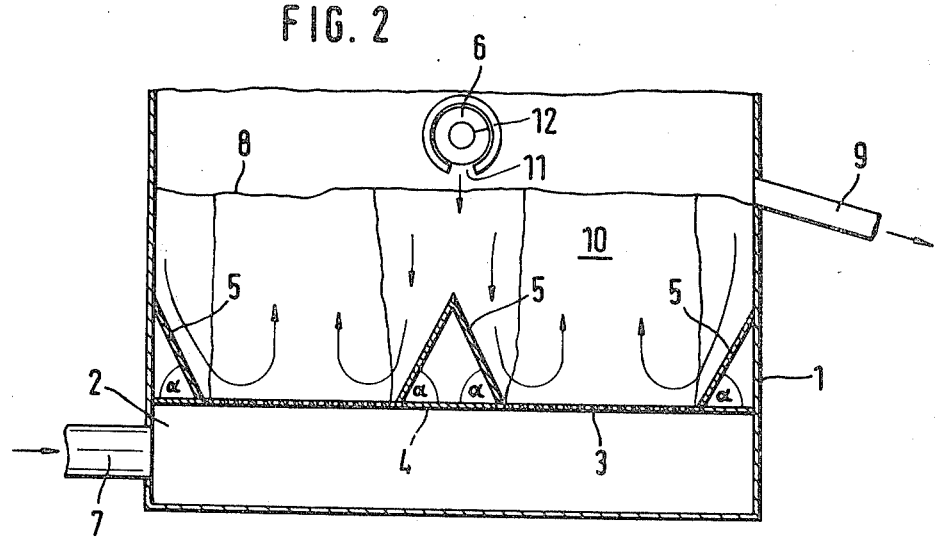
FIG. 2 is a view showing the fluidized bed reactor corresponding to that of FIG. 1, and additionally provided with prism-shaped inserts.

The fluidized bed reactor in FIG. 2 has the bottom 3 with the quieting zones 4 in which the passage of fluidizing gas is completely prevented. Advantageously, elongated inserts 5 are arranged on the bottom 3 and extend over the entire width of the bottom. The inserts 5 may have conical, pyramidal or prismatic cross-sections. The angle $\alpha$ of the lateral surfaces of the inserts 5 exceeds the friction angle of the fluidized bed material to avoid depositing of the latter. Because of the different horizontal mixing which is characteristic for each fluidized bed, the inserts 5 are so distributed over the bottom 3 that parallel distances between them do not exceed two meters.

The supply device 6 is also formed as a conveyor screw located above the insert 5 exactly over the upper surface of the fluidized bed. The supply device 6 is provided with a plurality of downwardly directed openings 11 which are spaced from one another by uniform distances equal to substantially one meter. The supply device 6 has a double jacket 12 through which a cooling medium, for example water, passes. Thereby the temperature of the supply device 6 is considerably lower than the reaction temperature of the supplied particulate material, for example lower than the degassification temperature of supplied coal.

Figure 3:
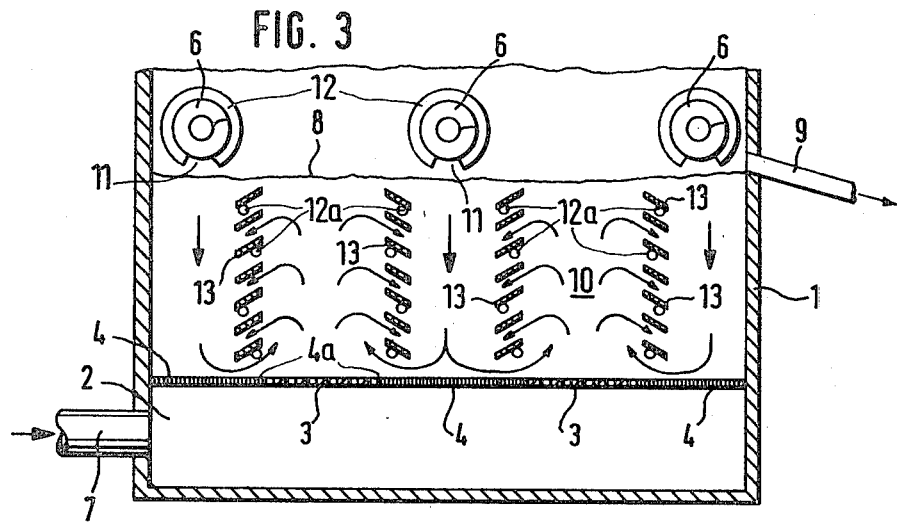
FIG. 3 is a view showing the fluidized bed reactor corresponding to FIG. 1, with jalousie-shaped inserts.
Figure 3C:
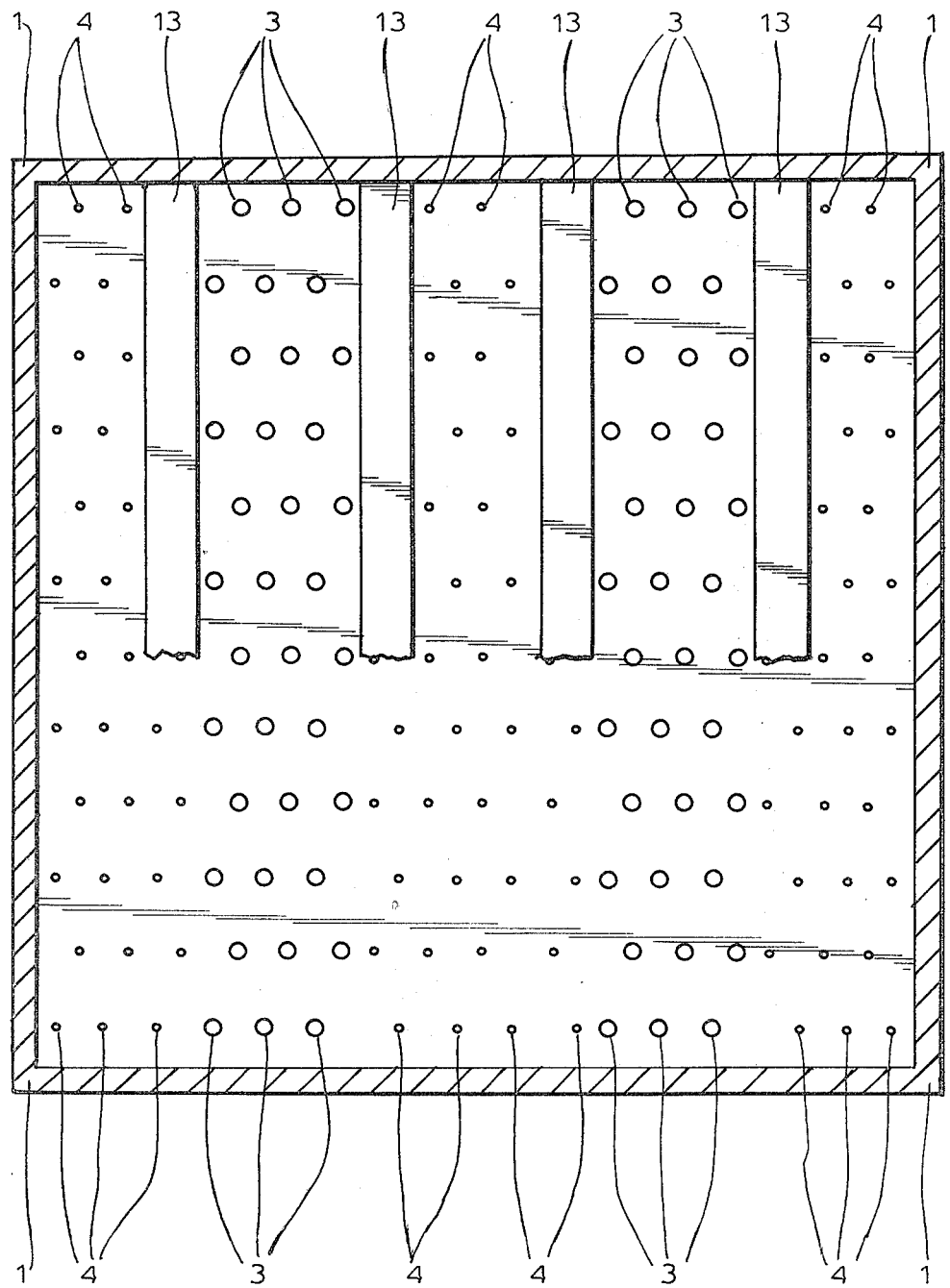
FIG. 3c is a plan view of the fluidized bed reactor of FIG. 3.

The fluidized bed reactor shown in FIGS. 3, 3b, 3c has the supply devices 6 which are arranged not only above the central quieting zone 4, but also above the quieting zones 4 in the vicinity of the wall of the reactor. The desirable downward movement of the freshly supplied particulate material is provided here with the aid of jalousie-shaped inserts 13 arranged above edges 4a of the zones 4. The jalousie-shaped inserts 13 arranged above the edges 4a of the quieting zones 4 of the bottom prevent travelling of the fluidized gas bubbles into the region of the particulate material feeding and also into the region above the quieting zones. In this case the desired movement of the particulate material particles is only insignificantly disturbed.

Individual lamellas of the jalousie-shaped inserts 13 are inclined toward the quieting zones 4. In such a construction the entrance of the fluidized gas from outside of the quieting zones into the latter is considerably reduced or prevented. Thereby the time of movement of the particles of particulate material in the fluidized bed is longer. This leads, for example for coal burning in the fluidized bed, to improvement in combustion and reduction of coal particles contents in the removed ashes. Thereby the effectiveness of treatment in the fluidized bed is considerably improved.

When the lamellas of the jalousie-shaped inserts 13 are inclined, then the particulate material fed from above into the quieting zone 4 cannot penetrate through the inserts and flow outwardly of the quieting zone 4. The inclined lamellas guide the particulate material downwardly and provide the downward movement of the particulate material to the very bottom of the fluidized bed reactor.

The jalousie-shaped inserts 13 can be designed so that a cooling medium flows through the same. For example they can be provided with not-shown pipes or formed as such pipes as shown in FIG. 3a and identified by 13a, so as to form a part of pipe registers immersed into the fluidized bed. It is to be understood that the jalousie-shaped inserts can be provided in the constructions shown in all Figures of the drawing.

The jalousie-shaped inserts 13 are formed similarly to blinds for windows or fan blades for air-conditioning devices. The angle of inclination of the jalousie-shaped inserts 13 can be adjusted if desired, in dependence upon the type of particulate material, conditions of the fluidized bed, etc. This adjustment can be performed by known means, for example by the same means which are utilized in window blinds or fan blades (not shown).

Figure 4:
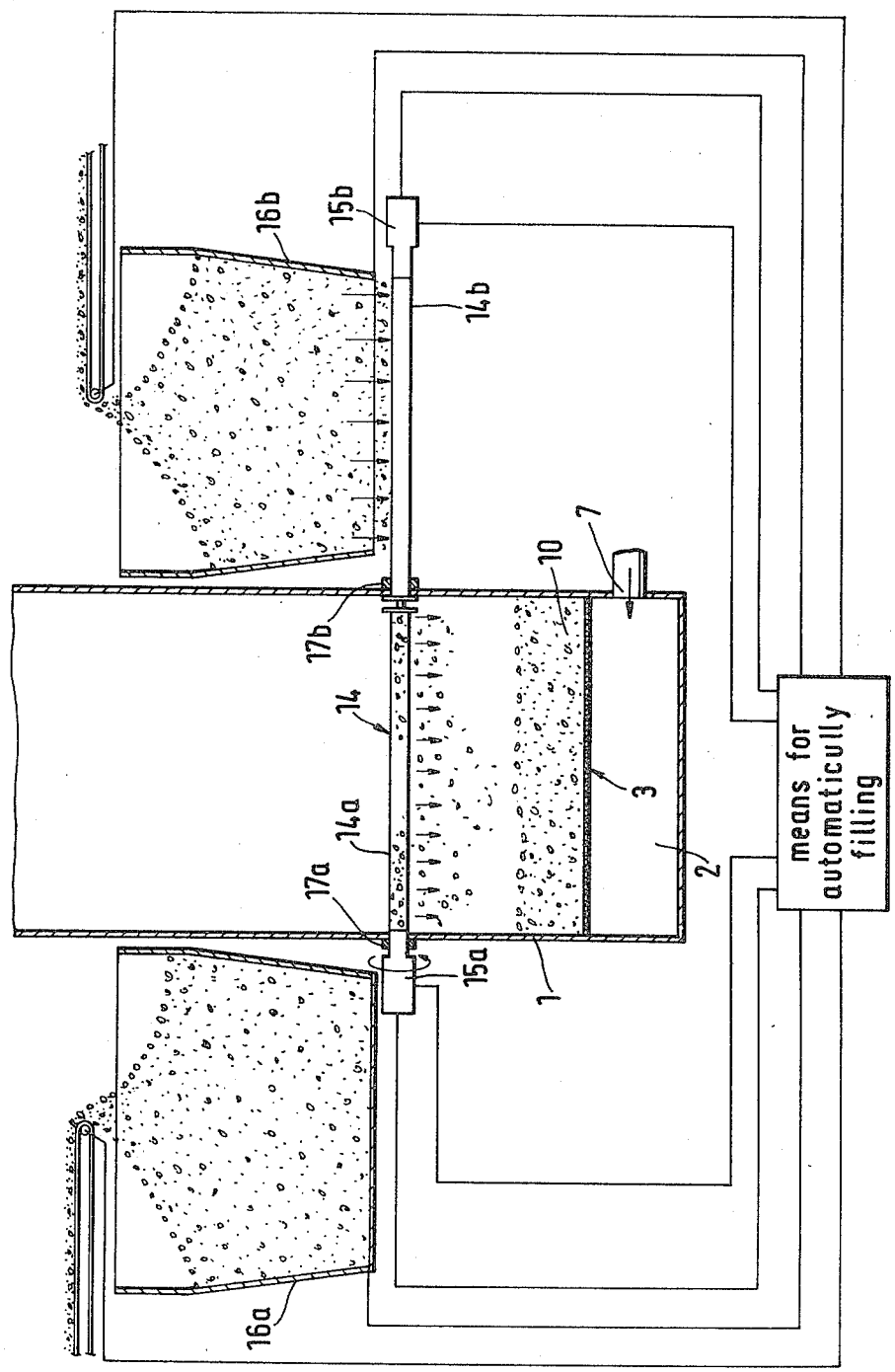
FIG. 4 is a view showing the fluidized bed reactor with a displaceable strap and feeding hoppers.
Figure 6:
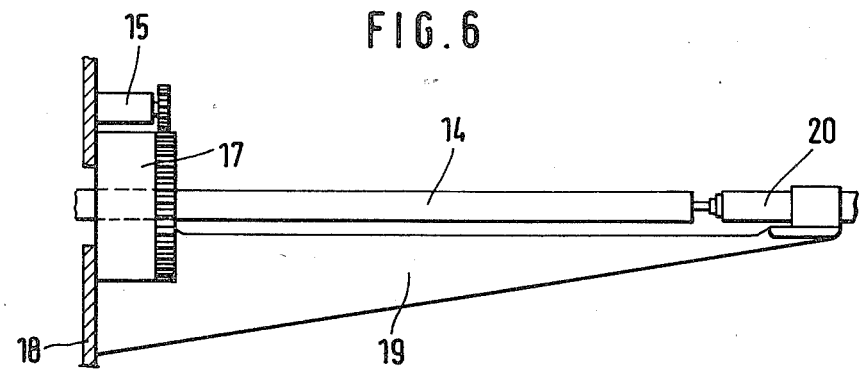
FIG. 6 is a view showing the displaceable strap with its drive means.
Figure 6B:
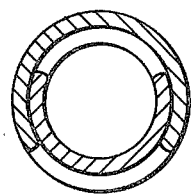
FIGS. 6a and 6b are an end view and a side view of the displaceable strap in section.
Figure 6A:
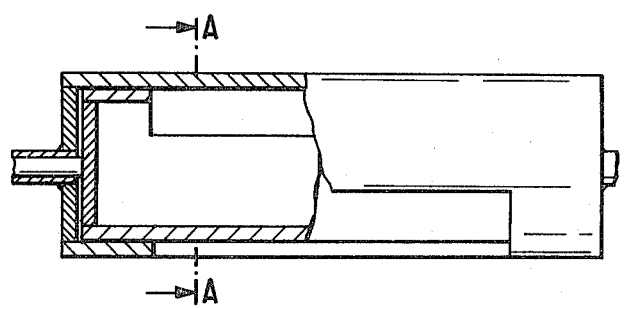

FIG. 4 shows the fluidized bed reactor with a displaceable strap 14 arranged above the fluidized bed 10, and FIGS. 6, 6a and 6b show the displaceable strap separately. The displaceable strap is composed of two parts each having a length corresponding to the widths of the fluidized bed reactor. When one half 14a of the displaceable strap 14 is located above the fluidized bed 10 so as to be emptied by turning the same with the aid of a rotary drive 15a, another part 14b of the displaceable strap 14 is located in the region of a feeding hopper 16b as shown in FIG. 9. The rotary drive includes a motor 15, a bush 17 arranged on the strap, and engaging gears therebetween. The displaceable strap 14 is provided with a drive 20 which is supported by a bracket 19 on a wall 18 and displaces the parts 14a and 14b of the strap to emptying and filling positions. When the part 14a is emptied, the displaceable strap 14 is displaced to the left, as seen in FIG. 4, so that the part 14a is located now under a feeding hopper 16a to be filled with particulate material. The part 14b which has been filled with particulate material from the hopper 16b is now located above the fluidized bed 10 and can be emptied by turning the displaceable strap 14.

Sealing elements 17a and 17b are provided between the displaceable strap 14 and the fluidized bed reactor 1 to reduce a gas exchange. The sealing, displacement, and emptying of the parts 14a and 14b of the displaceable strap 14 are performed by automatic synchronizing or cycle determining means.

As can be seen from FIG. 6, the displaceable strap forms together with its drive a modular unit. FIGS. 6a and 6b also show that the diaplaceable strap can be composed of two shell-shaped members arranged one inside the other.

Figure 5:
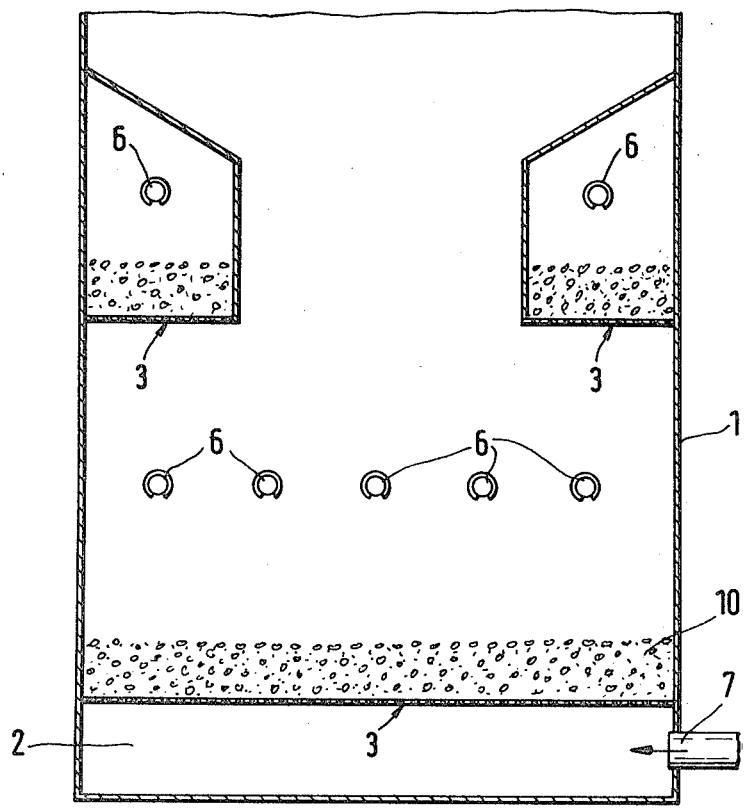
FIG. 5 is a view showing the fluidized bed reactor with several bottoms and associated supply devices.

The fluidized bed reactor shown in FIG. 5 has several bottoms 3 located one above the other and several supply devices 6 arranged thereabove. The quieting zones 4 are not shown here.

It will be understood that each of the elements described above, or two or more together, may also find a useful application in other types of constructions, differing from the types described above.

While the invention has been illustrated and described as embodied in a method of treating particulate materials in a fluidized bed reactor, and a fluidized bed reactor therefor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a fluidized bed reactor for treating particulate material, of the type which has means forming a working space, a bottom arranged for passage of a fluidizing gas therethrough and upwardly into said working space and having zones which are formed so that the passage of the fluidizing gas is at least reduced through said zones and the latter have edges, means for supplying the particulate material into said working space above at least one of said zones with reduced passage of the particulate material, and a plurality of inserts arranged in the working space, the improvement comprising:
the inserts being formed so that they are jalousie-shaped, arranged above said edges of said zones of said bottom, and having surfaces which are inclined towards said one zone of said bottom.

2. A fluidized bed reactor as defined in claim 1, wherein said zones of said bottom are formed as successively arranged bands.

3. A fluidized bed reactor as defined in claim 1, wherein said supply means has a plurality of downwardly extending through openings spaced from one another by uniform distances.

4. A fluidized bed reactor as defined in claim 1; and further comprising cooling means for cooling said supplying means.

5. A fluidized bed reactor as defined in claim 1, wherein said supplying means is formed as a conveyor screw.

6. A fluidized bed reactor as defined in claim 1, wherein said jalousie-shaped inserts are arranged so that a cooling medium flows therethrough.

7. A fluidized bed reactor as defined in claim 1; and further comprising at least a second such bottom having such zones, and at least second such supplying means associated therewith.

8. A fluidized bed reactor as defined in claim 1, wherein each of said jalousie-shaped inserts is composed of a plurality of lamellas extending in a substantially horizontal direction.

9. A fluidized bed reactor as defined in claim 8, wherein said lamellas have an adjustable angle of inclination towards said one zone of said bottom.

10. A fluidized bed reactor as defined in claim 1, wherein said zones of said bottom are formed so that they completely prevent the passage of the particulate material, said supplying means being arranged to supply the particulate material into the working space above at least one of these zones with prevented passage of the particulate material.

11. A fluidized bed reactor as defined in claim 10, wherein said bottom is provided with gas impermeable inserts located in said zones of completely prevented passage of the fluidizing gas.

12. A fluidizing bed reactor as defined in claim 11, wherein said gas impermeable inserts are cone-shaped.

13. A fluidizing bed reactor as defined in claim 11, wherein said gas impermeable inserts are pyramid-shaped.

14. A fluidized bed reactor as defined in claim 11, wherein said gas impermeable inserts are prism-shaped.

15. A fluidized bed reactor as defined in claim 11, wherein the material of the fluidized bed has a predetermined angle of friction, said gas impermeable inserts have lateral surfaces which are inclined at an angle exceeding the angle of friction.

16. A fluidized bed reactor as defined in claim 1, wherein said supplying means is formed as a displaceable strap.

17. A fluidized bed reactor as defined in claim 16; and further comprising means for automatically filling, displacing, and emptying said displaceable strap.

18. A fluidizing bed reactor as defined in claim 16, wherein said displaceable strap is provided with actuating means and forms together with the latter a modular unit.

19. A fluidizing bed reactor as defined in claim 16, wherein said displacable strap is a one member unit.

20. A fluidized bed reactor as defined in claim 16, wherein said displaceable strap is a unit composed of two members.

21. A fluidized bed reactor as defined in claim 16, wherein said working space has a predetermined width, said displaceable strap having a length which is at least twice as much as the width of said working space.

22. A fluidized bed reactor as defined in claim 16, wherein said displaceable strap is movable between a filling position in which it is located outside of said working space and filled with particulate material, and a discharging position in which it is located inside said working space and is emptied of particulate material.

23. A fluidized bed reactor as defined in claim 22; and further comprising sealing means arranged between said displaceable strap and said working space forming means.

* * * * *